US010256858B1

(12) United States Patent
Hakkola

(10) Patent No.: US 10,256,858 B1
(45) Date of Patent: Apr. 9, 2019

(54) SYSTEM, APPARATUS AND METHOD FOR REDUCING AUDIO ARTIFACTS IN A PHASE DIVERSITY RECEIVER

(71) Applicant: Silicon Laboratories Inc., Austin, TX (US)

(72) Inventor: Alexander August Arthur Hakkola, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 15/707,306

(22) Filed: Sep. 18, 2017

(51) Int. Cl.
| H04B 1/12 | (2006.01) |
| H04B 7/08 | (2006.01) |
| H04L 25/03 | (2006.01) |
| H04L 27/26 | (2006.01) |

(52) U.S. Cl.
CPC ........... H04B 1/126 (2013.01); H04B 7/0845 (2013.01); H04B 7/0848 (2013.01); H04L 25/03866 (2013.01); H04L 27/265 (2013.01)

(58) Field of Classification Search
CPC .... H04B 1/126; H04B 7/0845; H04B 7/0848; H04L 25/03866; H04L 27/265
See application file for complete search history.

(56) References Cited

U.S. PATENT DOCUMENTS

| 5,335,359 | A | * | 8/1994 | Tsujimoto | ............ | H04B 7/0667 375/347 |
| 5,524,023 | A | * | 6/1996 | Tsujimoto | .............. | H04B 1/126 375/232 |
| 6,836,507 | B1 | * | 12/2004 | Gifford | ................ | H04B 7/0837 375/150 |
| 8,331,887 | B2 | | 12/2012 | Tuttle et al. | | |
| 8,781,421 | B2 | | 7/2014 | Elenes et al. | | |
| 9,001,945 | B2 | | 4/2015 | Elenes et al. | | |
| 9,118,533 | B2 | | 8/2015 | Elenes et al. | | |
| 2008/0246672 | A1 | * | 10/2008 | Sliskovic | ............. | H01Q 1/3275 343/713 |
| 2009/0298453 | A1 | | 12/2009 | Elenes | | |
| 2010/0157909 | A1 | * | 6/2010 | Miura | .................. | H04B 7/0851 370/329 |
| 2010/0279642 | A1 | * | 11/2010 | Nishikawa | ........... | H04B 7/0857 455/273 |
| 2010/0284497 | A1 | * | 11/2010 | Toyama | ............... | H04B 7/0865 375/340 |

(Continued)

OTHER PUBLICATIONS

Silicon Laboratories, "Si47901-02 High-Performance Automotive AM/FM Radio Receiver and HD Radio/DAB/DAB+/DMB/DRM Tuner," Mar. 12, 2015, 1 page.

(Continued)

*Primary Examiner* — Nguyen T Vo
(74) *Attorney, Agent, or Firm* — Trop, Pruner & Hu, P.C.

(57) ABSTRACT

In one embodiment, an apparatus includes: a first radio receiver to receive and downconvert a first radio frequency (RF) signal to a first digital signal; a second radio receiver to receive and downconvert a second RF signal to a second digital signal; a correlation circuit to receive the first and second digital signals and determine a correlation between the first and second digital signals; a weight calculation circuit to determine a first weight value and a second weight value based at least in part on the correlation; and a combiner circuit to combine the first and second digital signals according to the first and second weight values.

20 Claims, 12 Drawing Sheets

(56) References Cited

U.S. PATENT DOCUMENTS

2015/0288440 A1* 10/2015 Imao .................. H04B 7/08
375/347

OTHER PUBLICATIONS

Silicon Laboratories, "Si4790x High-Performance Automotive AM/FM Radio Receiver and HD Radio™ /DAB/DAB+/DMB/DRM Tuner," Aug. 25, 2014, 3 pages.

* cited by examiner

SYSTEM, APPARATUS AND METHOD FOR REDUCING AUDIO ARTIFACTS IN A PHASE DIVERSITY RECEIVER

BACKGROUND

In certain radio receiver systems, phase diversity is used to combine signals received from multiple antenna inputs that are spatially separated, resulting in different channel phase and condition. Such phase diversity operation is typically used to decrease signal impairment events. That is, with two channel phases, the signals can be combined and since the signals are the same before the channel impairments, audio artifacts can be minimized. However, in conventional phase diversity combining some signal information from each antenna source can still cause impairments. While this combining may be suitable when one antenna is impaired and the other antenna is not, in the condition of a highly impaired signal conventional phase diversity operation can still lead to a resulting signal that includes undesired noise or other audio artifacts.

SUMMARY OF THE INVENTION

In one aspect, an apparatus includes: a first radio receiver to receive and downconvert a first radio frequency (RF) signal to a first digital signal; a second radio receiver to receive and downconvert a second RF signal to a second digital signal; a correlation circuit to receive the first digital signal and the second digital signal and determine a correlation between the first digital signal and the second digital signal; a weight calculation circuit to determine a first weight value and a second weight value based at least in part on the correlation; and a combiner circuit to combine the first digital signal and the second digital signal according to the first weight value and the second weight value.

In an embodiment, the weight calculation circuit is to determine the first weight value and the second weight value further based on at least one signal metric associated with the first digital signal and at least one signal metric associated with the second digital signal. The weight calculation circuit may adjust the first weight value and the second weight value determined further based on the at least one signal metric associated with the first digital signal and the at least one signal metric associated with the second digital signal when the correlation indicates the first digital signal is uncorrelated with the second digital signal. The weight calculation circuit may determine the first weight value and the second weight value for a plurality of samples of the first digital signal and the second digital signal. The weight calculation circuit may adjust the first weight value and the second weight value for a first sample of the plurality of samples of the first digital signal and a first sample of the plurality of samples of the second digital signal based at least in part on a phase difference between the first digital signal and the second digital signal.

In an embodiment, the correlation circuit is to determine the correlation comprising a cross-correlation between the first digital signal and the second digital signal. In response to the correlation indicating that the second digital signal is uncorrelated with the first digital signal, the weight calculation circuit may adjust the first weight value to be substantially greater than the second weight value, where the correlation results from receipt of first content in the first RF signal and receipt of second content in the second RF signal, the first content different than the second content.

In one embodiment, the apparatus is a phase diversity receiver that includes: a first semiconductor die including the first radio receiver to receive the first RF signal from a first antenna; and a second semiconductor die including the second radio receiver to receive the second RF signal from a second antenna, the second antenna spatially separated from the first antenna. The apparatus may further include a digital signal processor comprising the correlation circuit and the weight calculation circuit.

In another aspect, a method includes: receiving and processing a first RF signal from a first antenna into a processed first signal; receiving and processing a second RF signal from a second antenna into a processed second signal; determining first signal metric information based on the processed first signal and determining second signal metric information based on the processed second signal; determining a correlation between the processed first signal and the processed second signal; and combining the processed first signal and the processed second signal based on the first signal metric information and the second signal metric information, and adjusting the combining based on the correlation.

The method may further include: determining a first combining ratio based on the first signal metric information and the second signal metric information; determining a combining ratio modifier based on the correlation; establishing the first combining ratio to be a first modified combining ratio in response to the correlation indicating that the processed first signal is correlated to the processed second signal to at least a threshold level; and establishing an adjusted combining ratio to be the first modified combining ratio in response to the correlation indicating that the processed first signal is correlated to the second process signal to less than the threshold level. The method also may include adjusting the first combining ratio using the combining ratio modifier, the combining ratio modifier based on a filtered correlation value determined over a plurality of groups of samples of the processed first signal and the processed second signal, each of the plurality of groups including a plurality of samples of the processed first signal and a plurality of samples of the processed second signal, and determining a first phase difference value and a second phase difference value based on at least one of the first signal metric information and the second signal metric information.

In an embodiment, the method may further include: establishing the first combining ratio to be an initial combining ratio in response to a difference between the first phase difference value and the second phase difference value being less than a first threshold and the correlation indicating that the processed first signal is correlated to the processed second signal to at least a second threshold level; and otherwise, establishing the first modified combining ratio to be the initial combining ratio. The method further may include: generating a first weight value and a second weight value according to the initial combining ratio; weighting the processed first signal according to the first weight value; weighting the processed second signal according to the second weight value; combining the weighted processed first signal and the weighted processed second signal; and outputting the combined signal to a demodulator. The method further may include: determining a phase difference between a first sample of the processed first signal and a first sample of the processed second signal; and adjusting the first weight value and the second weight value based on the phase difference. The method may further include combining the processed first signal and the processed second signal according to the adjusted first weight value and the adjusted second weight value.

In another aspect, an apparatus includes: a first radio receiver to receive and downconvert a first RF signal from a first antenna to a first digital signal; a second radio receiver to receive and downconvert a second RF signal from a second antenna to a second digital signal; a phase aligner circuit to phase align the first digital signal and the second digital signal; a correlation circuit to receive the first digital signal and the second digital signal and determine a correlation between the first digital signal and the second digital signal; a weight calculation circuit to determine a first weight value and a second weight value based at least in part on the correlation; and a combiner circuit to use the first weight value and the second weight value to combine the first phase aligned digital signal and the second phase aligned digital signal into a combined signal.

In an embodiment, the weight calculation circuit is to determine a phase difference between a first sample of the first digital signal and a first sample of the second digital signal and adjust at least one of the first weight value and the second weight value based on the phase difference. The weight calculation circuit may further adjust the first weight value and the second weight value based on at least one signal metric associated with the first digital signal and at least one signal metric associated with the second digital signal when the correlation exceeds a threshold.

DETAILED DESCRIPTION

In various embodiments, techniques are provided to improve operation of a phase diversity receiver when processed signals of multiple signal paths of the receiver are uncorrelated. Such uncorrelated signals may occur in a case where directional antennas of a vehicle each receive a signal from a different transmitter when tuned to the same frequency. In this case, a phase diversity receiver without an embodiment herein could continue to combine these two uncorrelated sources, resulting in bad audio. Embodiments may be used to reduce audio artifacts when combining two uncorrelated signals by detecting this situation and dynamically controlling weighting values of the signals of the multiple paths to weight towards a processed signal having one or more higher signal quality metrics. Note that uncorrelated signals may also exist when at least one of the processed signals has impairments.

As will be described herein, a correlation is computed between demodulated signals of the two paths. When it is determined that the two signals are not correlated the weighting values may be adjusted to select signal weighting based on signal quality metrics. The weighting values also may be determined at least in part on a phase difference determination between the signals, which when of a given level, causes weighting values to be adjusted based on signal metrics. When this phase difference is large enough, a slower metric may be used to select weightings. In addition, embodiments may enable the weighting values to be dynamically adjusted on a sample-by-sample basis, based on a determination of phase differences between the two processed signals. That is, at a very fast rate, the weighting values can be modified based on a current phase difference between the samples of each signal.

Figure 1:
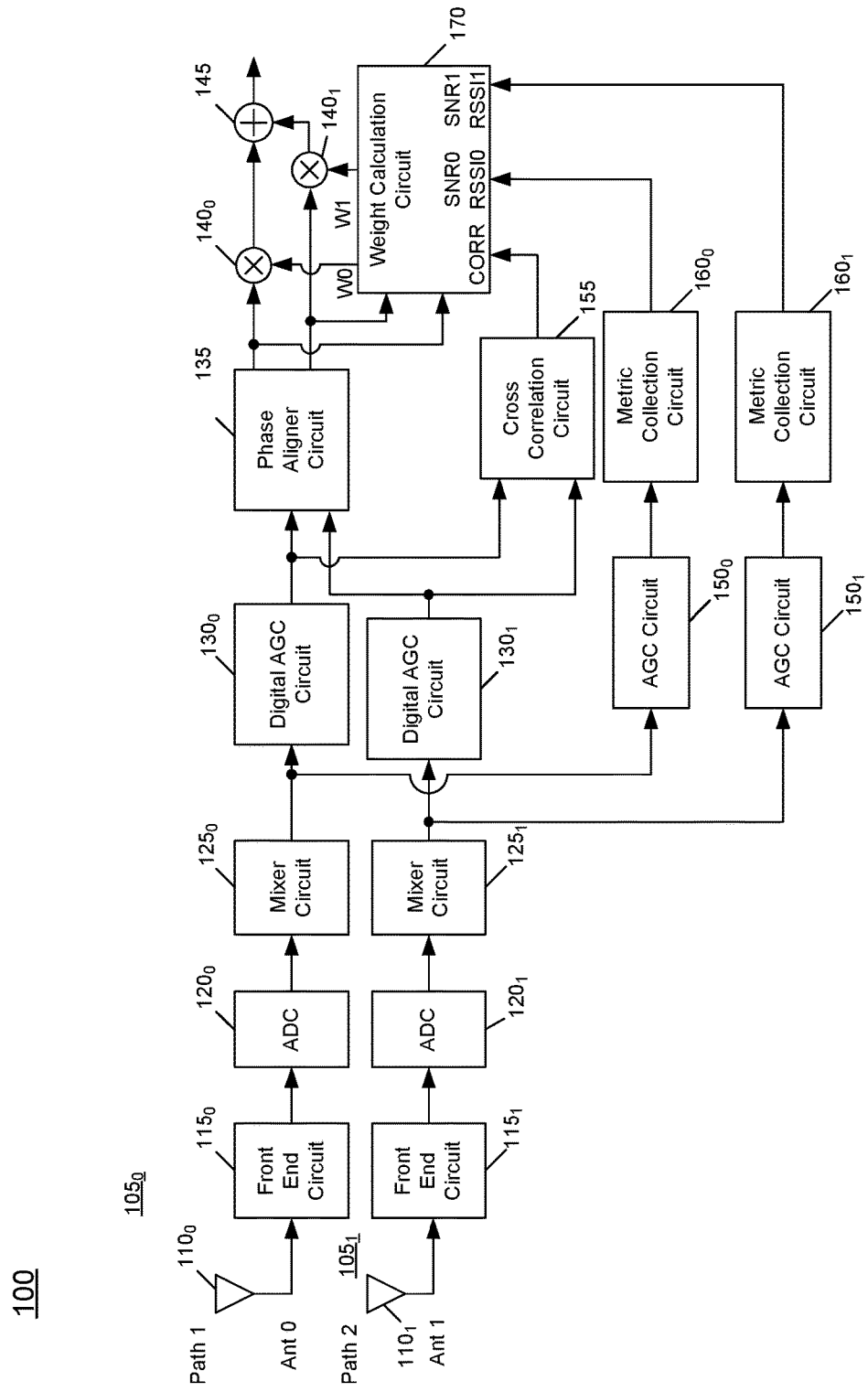
FIG. 1 is a block diagram of a receiver in accordance with an embodiment.

Referring now to FIG. 1, shown is a block diagram of a receiver in accordance with an embodiment. As illustrated in FIG. 1, receiver 100 is a phase diversity receiver. As one example, receiver 100 may be a radio receiver incorporated into a vehicle, such that incoming radio frequency (RF) signals may be received by way of multiple antennas $110_0$, $110_1$ and processed in independent processing paths $105_0$, $105_1$. After suitable processing, the resulting processed signals may be combined to provide improved audio fidelity, particularly in cases of impairments such as multipath fading and other channel impairments. Embodiments also may detect when the processed signals of the two signal paths are uncorrelated and take appropriate control measures with regard to the diversity combining to ensure that signal information from a better performing signal path is primarily used. Stated another way, when an uncorrelation between the two signal paths is detected, diversity combining may alter the combining ratio compared with a traditional combiner so that the better performing signal path may be primarily used for the output. Still further as described herein, fast and dynamic control of weightings applied to each of the signal paths can occur on a sample-by-sample basis.

For ease of discussion, components within first signal processing path $105_0$ are discussed. Understand that the same components are present in second signal processing path $105_1$. And thus, reference numerals (without subscript) are intended to refer to generic components suitable for the various signal paths. As illustrated, incoming RF signals are received via an antenna $110_0$. The received RF signals are provided to an analog front end circuit $115_0$. Various signal processing of these RF signals may occur in front end circuit 115. As an example, such processing may include gain control, such as by way of a low noise amplifier (LNA). In some cases, front end circuit 115 may further include a filter. The processed signals are provided to a digitizer, namely an analog-to-digital converter $120_0$, which digitizes the incoming analog signal into digital form. The resulting digitized signal is provided to a mixer circuit $125_0$. Mixer circuit $125_0$ may downconvert the digitized signal from RF to a lower frequency. In one embodiment, mixer $125_0$ may downconvert the RF signal to a zero intermediate frequency (ZIF) level. Of course, downconversion to other frequencies is possible. Understand that additional processing may be performed within mixer circuit $125_0$. For example, additional circuitry within this block may include a low pass filter and a de-rotator, among other circuitry.

Still with reference to FIG. 1, the downconverted signal output from mixer circuit $125_0$ is provided to a digital automatic gain control (AGC) circuit $130_0$. AGC circuit 130 may provide a controllable amount of gain to the downconverted signal. Additional circuitry may be present within this block, including a channel filter. The output of digital AGC circuit $130_0$ is provided to a phase aligner circuit 135. As illustrated, phase aligner circuit 135 is configured to receive the resulting signals from both signal processing paths 105 and perform a phase alignment to align samples of these two paths in phase.

After phase alignment, the resulting phase-aligned signals of the two paths are output to multipliers $140_0$, $140_1$ which multiply the phase-aligned signals of each of the signal processing paths with a corresponding weight value (W0 and W1) received from a weight calculation circuit 170, details of which are described below. Suffice to say in one example, these weight values may be fractional values (that collectively sum to one). The resulting products output by multipliers 140 (namely the phase-aligned signals each multiplied by a coefficient corresponding to the weight values) is provided to a summer 145, which combines the weighted values from the two signal processing paths to obtain a combined signal. Understand that additional processing may be performed on the combined signal. For example, the combined signal may be provided to a demodulator, which may perform demodulation to output an audio signal to an output device such as speakers of receiver system 100 (not shown in FIG. 1).

Note that signal paths $105_0$, $105_1$ may be implemented on a single semiconductor die of a single integrated circuit (IC). In other cases, signal paths 105 may be implemented on separate die within one or more semiconductor packages. Still further, note that while signal paths $105_0$, $105_1$ are shown generally identical through AGC circuit 130, understand that the additional components described in receiver 100 may be present in one or both signals paths, with certain components not used in one or more the other of signal paths 105 depending upon implementation.

Also understand that while some embodiments may implement the various circuitry shown in FIG. 1 as discrete circuits, in other cases, the digital circuitry (namely all circuitry after downconversion in mixer circuit 125) may be implemented within a programmable execution circuit, such as one or more digital signal processors (DSPs).

As described herein, different control techniques for combining signals of the two signal processing paths may be used, depending upon various information, including signal metric information and correlation information. More particularly, each signal path is coupled to a metric collection circuit $160_0$, $160_1$ that may determine one or more signal metrics from the signal information. As seen, metric collection circuits 160 may receive signal information from corresponding AGC circuits $150_0$, $150_1$ (which in turn may include channel filters). In embodiments herein, this signal metric information may include signal-to-noise (SNR) ratio. Note while described as being a "signal"-to-noise ratio, in some cases the actual metric may be a "carrier"-to-noise ratio (CNR) metric. In addition, the signal metric information may include received signal strength indicator (RSSI) information.

Still further as shown in FIG. 1, the signals of the two paths, prior to phase alignment in phase aligner circuit 135, may be provided to a cross correlation circuit 155 that performs a cross correlation of the signals of the two paths. In an embodiment, the correlation may be calculated as follows: $y=E[(x\_1-u\_1)*(x\_2-u\_2)]/(sigma\_1*sigma\_2)$: where E is the expected value; x_1 is signal 1; u_1 is the mean of signal 1; sigma_1 is the standard deviation of signal 1; x_2 is signal 2; u_2 is the mean of signal 2; and sigma_2 is the standard deviation of signal 2. Note that this correlation, which in this embodiment is a cross correlation, is not a signal metric. That is, a correlation provides an indication of a level of matching or coherency between different signals (which in many cases may derive from the same transmitted content). Nevertheless, understand that as used herein, the terms "correlation" or "cross correlation" do not refer to signal metric information, as a correlation value does not provide any qualitative measure of the involved signals.

As shown, weight calculation circuit 170 receives these signal metrics and correlation information, and using this information and various predetermined values as described herein, determines appropriate weightings for the two different signal paths during receiver operation. Understand while shown at this high level in the embodiment of FIG. 1, many variations and alternatives are possible. As one example, an embodiment may be used in an FM-based radio scheme, although other embodiments may be used for other radio types. Also, understand that for ease of discussion herein a phase diversity receiver including two independent signal processing paths is described. It is also possible for a phase diversity receiver to include additional independent signal processing paths, where each such independent signal processing path is coupled to receive an incoming RF signal from a different antenna input. For example, in a vehicle context, antennas $110_0$, $110_1$ may be independently implemented, e.g., in driver and passenger side view mirrors. In yet other cases, additional antennas may be spatially separated and adapted within various portions of a vehicle to provide greater phase diversity capabilities.

Figure 2:
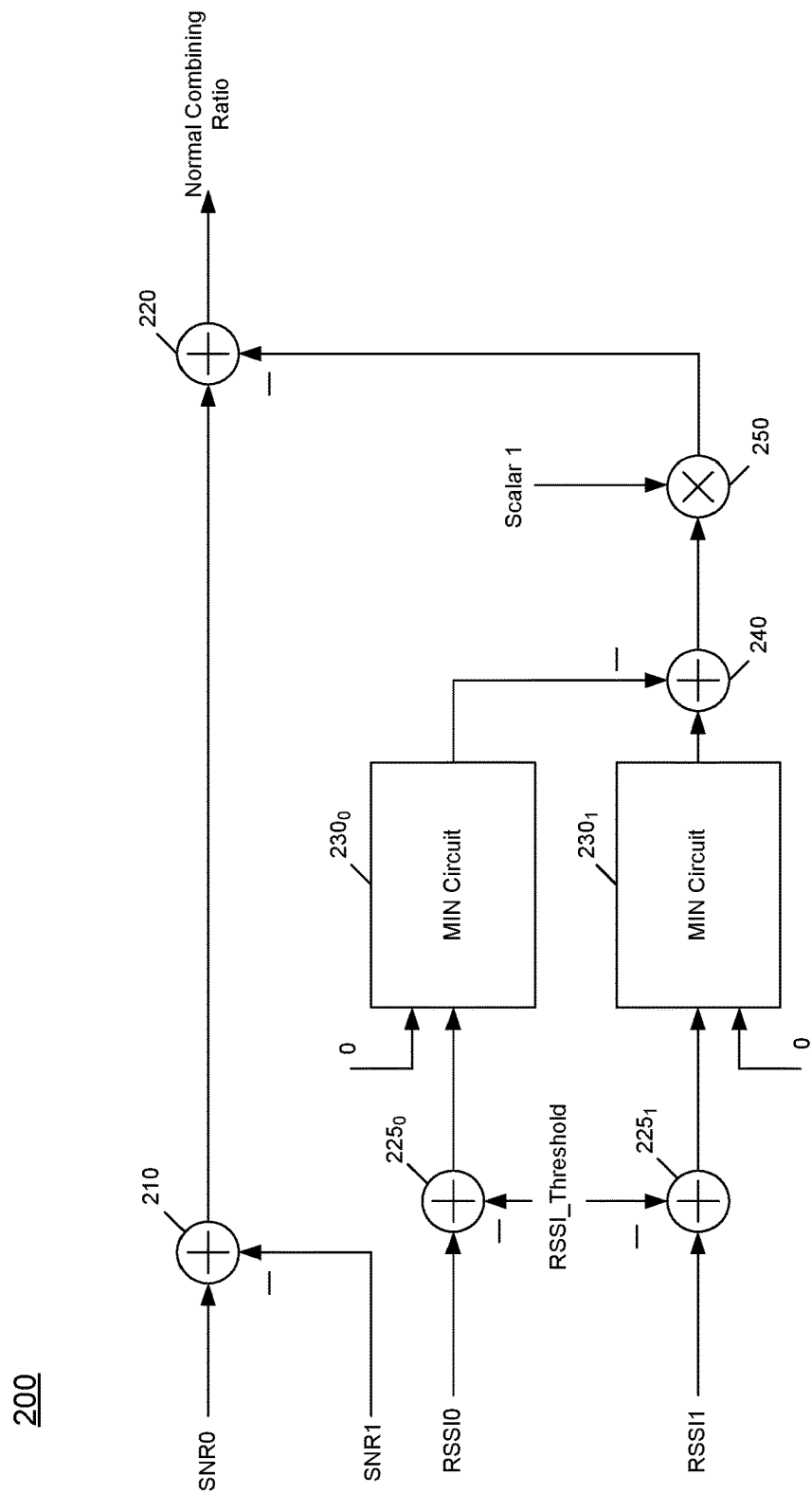
FIG. 2 is a block diagram of a portion of a weight combining circuit in accordance with an embodiment.

Referring now to FIG. 2, shown is a block diagram of a portion of a weight combining circuit in accordance with an embodiment. More specifically, initial combiner weight circuit 200 may be used to develop a baseline combining ratio for combining signals of the two paths. Note that in different embodiments, initial combiner weight circuit 200 may be implemented as a hardware circuit to perform the various operations described herein. In other cases, circuit 200 may be implemented using hardware circuitry such as a general-purpose processor, microcontroller, digital signal processor or so forth to perform the operations described herein, e.g., in combination with firmware and/or software. In yet other implementations, combinations of hardware, firmware and/or software may be used to implement circuit 200. Similar implementations may be used for the various circuits described in FIGS. 3 to 8. Initial combiner weight circuit 200 may be included within weight calculation circuit 170 of FIG. 1. Understand that the additional circuits described in FIGS. 3 to 8 also may be implemented, in an embodiment, within weight calculation circuit 170 of FIG. 1.

With reference to FIG. 2, the baseline combining ratio (Normal Combining Ratio in FIG. 2) may be a suitable combining ratio to use when the signals of the two paths are substantially correlated. In general, initial combiner weight circuit 200 determines the combining ratio based on multiple signal metrics of the multiple signal paths, namely SNR and RSSI.

Note that in an embodiment, the signal metrics may be obtained on a sub-sampling basis. For example, as will be described herein, some of the processing may be performed on a plurality of samples of the two signal paths. In such cases, instead of obtaining metrics for each such sample of a group of samples, sub-sampled signal quality metrics may be obtained for a given group of samples undergoing an evaluation. In one example, certain of the processing described herein may be performed on a group of 16 samples of each of the two signal paths. In this example, it is possible for a single signal quality metric (namely one SNR value and one RSSI value) to be used for this group of samples. Thus in this example, for a given group of samples (e.g., 16 samples), initial combiner weight circuit 200 may generate a single baseline combining ratio (Normal Combining Ratio). Of course other examples are possible.

As seen, incoming signal metric values for the two signal paths (namely SNR0 and SNR1) are provided to a summer 210 that determines a difference and sends this difference to another summer 220, further configured to receive another processed signal metric value. Specifically, incoming RSSI information (RSSI0, RSSI1) is provided to corresponding summers $225_0$, $225_1$. As seen, summers $225_0$, $225_1$ further receive a programmable threshold value (RSSI THRESH). This threshold may be used to reduce the influence of this RSSI information when it is of particularly low value. Thus as illustrated, if the resulting differences from summers 225 are less than a predetermined level (e.g., 0), the given RSSI value may be discounted or mitigated in the weight combining determination. That is, by way of a minimum circuit $230_0$, $230_1$, a minimum of a predetermined value (e.g., 0) or the difference output by summer 225 is output, in turn to another summer 240, in turn coupled to a multiplier 250 that multiplies the resulting processed RSSI value with a given coefficient (which in an embodiment may be a predetermined value, e.g., a first constant (Scalar 1)). Note that this scalar value, and a plurality of other scalar values described herein may be constants provided for a particular receiver. For example, these constants may be set by firmware or another programmable source and stored in a non-volatile storage. In some cases these scalar values may be determined based on typical radio constraints and/or listening preferences. The output of summer 220 is a combining ratio (Normal Combining Ratio) that may be the maximum ratio of the two signals, without mitigation, if correlated signals are being combined.

Figure 3:
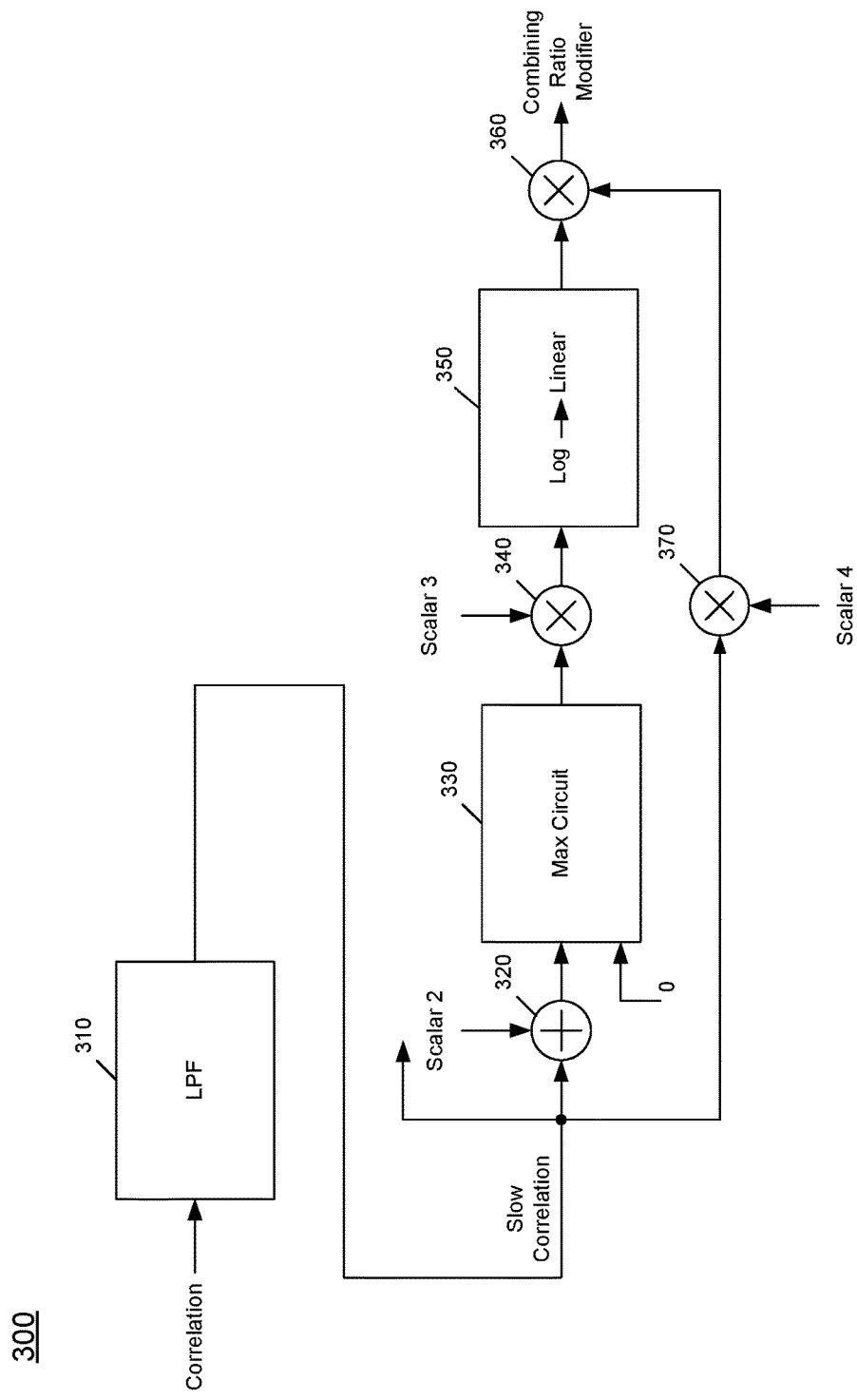
FIG. 3 is a block diagram of a first combiner weight modification circuit in accordance with an embodiment.

Referring now to FIG. 3, shown is a block diagram of a first combiner weight modification circuit in accordance with an embodiment. As shown in FIG. 3, circuit 300 may be used to generate a modifier value for use in modifying the baseline combining ratio in the context of uncorrelated signals. Note that uncorrelated signals may occur in different situations. As one example, the signals in the two signal paths may be uncorrelated where the signals are obtained from different content. That is, in a phase diversity receiver the two different antenna may receive RF signals from two different transmission sources that are outputting different content, which is thus uncorrelated. In other cases, the signals in the two paths may be uncorrelated where, although including the same content, they have substantially different CNR levels. For example, at least one of the signals may have a CNR level that is of relatively low level (e.g., within a noise floor).

As illustrated, modification circuit 300 is coupled to receive a correlation value, which in an embodiment is a cross correlation value. This correlation value is provided to a low pass filter 310, resulting in a slow correlation signal (Slow Correlation in FIG. 3). Note that this slow correlation value may result from low pass filter 310 that has a relatively large time constant. For example, while the various signal processing described herein is generally performed on groups of samples (e.g., 16 individual samples), in embodiments LPF 310 may act to generate a slow correlation signal over many such blocks of samples. For example, in some embodiments LPF 310 may generate the slow correlation value over hundreds of these blocks, thus smoothing variations in correlation values.

In one embodiment, the correlation between signals received in LPF 310 may be generated in a cross correlation circuit (e.g., cross correlation circuit 155 of FIG. 1). Note that this cross correlation may be in units of power (e.g., decibels (dB)). In a particular embodiment, a highly correlated signal may have a slow correlation value of approximately zero, whereas a wholly uncorrelated signal may have a slow correlation value of, e.g., approximately 128 (in the instance where this slow correlation value is an 8-bit value).

As seen, this slow correlation value is provided to a summer 320, where it is combined with a predetermined value (Scalar 2). The resulting summed signal is coupled to a maximum circuit 330 that outputs the maximum of the summed signal or a predetermined value (e.g., 0). The resulting maximum value is multiplied in a multiplier 340 by a coefficient value (Scalar 3). The resulting product is transformed into a linear value by way of a log-to-linear operator 350. This resulting value is multiplied in a multiplier 360 by a coefficient, namely the output of a multiplier 370, itself generating a product of the slow correlation value and another predetermined value (Scalar 4). This resulting product of multiplier 360 is a modifier value (Combining Ratio Modifier) that provides an indication of how much the baseline combining ratio may be modified for uncorrelated signals. In general, this modifier value may result from an approximate curve fitting, where a change in this slow correlation value is modified in a non-linear fashion.

Figure 4:
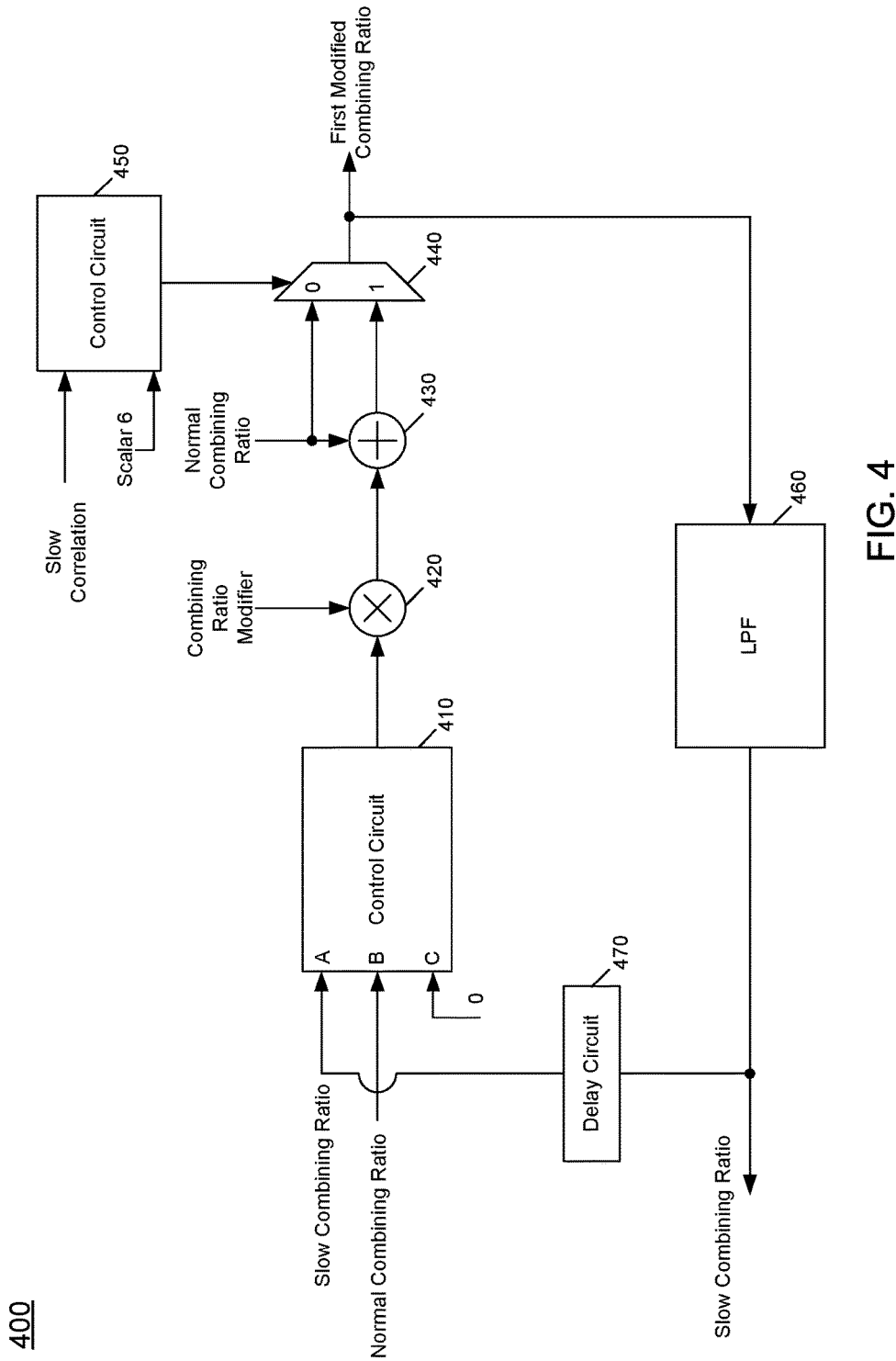
FIG. 4 is a block diagram of another weight modification circuit in accordance with an embodiment.

Referring now to FIG. 4, shown is a block diagram of another weight modification circuit in accordance with an embodiment. As shown in FIG. 4, circuit 400 may be used to calculate a first modified combining ratio, which is used to determine a slow combining ratio, namely a combining ratio based on analysis of a plurality of samples.

As illustrated, the baseline combining ratio (Normal Combining Ratio) is provided as a second input (input B) to a control circuit 410. A first input to control circuit 410 (namely input A) is a low pass filtered version of the first modified combiner ratio output by circuit 400. As such, the output of a low pass filter 460 provides this slow combining ratio, which in turn is delayed by a delay circuit 470. A third input to control circuit 410 may be a predetermined value (e.g., 0). In an embodiment, control circuit 410 may be configured to generate an output based on the three input values. In a particular embodiment, control circuit 410 may operate to output a positive or negative predetermined value or a zero value based on various calculations performed in control circuit 410. In a particular embodiment, control circuit 410 is configured to determine: if (A<C) and (B<C), output—Scalar 5; if (A>C) and (B>C), output Scalar 5; and otherwise output the zero value. Stated another way, control circuit 410 is configured to determine whether a combining ratio determined based on signal metrics is pointing to the same signal path (and the same antenna) as being a better quality as determined based on a long term average of the combining ratio.

As further illustrated in FIG. 4, the output of control circuit 410 is provided to a multiplier 420, where it is combined with the combining ratio modifier, which is an indication of how much the normal combining ratio may be modified in response to identification of uncorrelated signals. The product output by multiplier 420 is provided to a summer 430, where it is combined with the baseline combining ratio (Normal Combining Ratio). In turn, the resulting sum is provided to a selector 440, which in an embodiment may be implemented as a multiplexer. As illustrated, multiplexer 440 may be controlled based on an output of another control circuit 450. As illustrated, control circuit 450 is configured to receive at a first input (input A) the slow correlation value, which provides an indication as to a level of correlation between the two signals. A second input to control circuit 450 (input B) may be a predetermined value (Scalar 6). In an embodiment, control circuit 450 may control the selection of output from multiplexer 440. If the signals are correlated, multiplexer 440 may be controlled to output the baseline combining ratio (namely Normal Combining Ratio). Instead, if the signals are not well correlated, multiplexer 440 may be controlled to output a modified combining ratio (namely the output of summer 430).

As such, weight modification circuit 400 may operate based on determination of correlation level. That is, the slow correlation value identifies if the signals are correlated or not, with large values being not correlated and a value of zero being fully correlated. At multiplier 420, the Combining Ratio Modifier is multiplied by a positive or negative value to drive the ratio towards only one antenna, or to not change the Normal Combining Ratio, based on whether the slow combining ratio and the current combining ratio (Normal Combining Ratio) both show the same antenna is the better choice.

Figure 5:
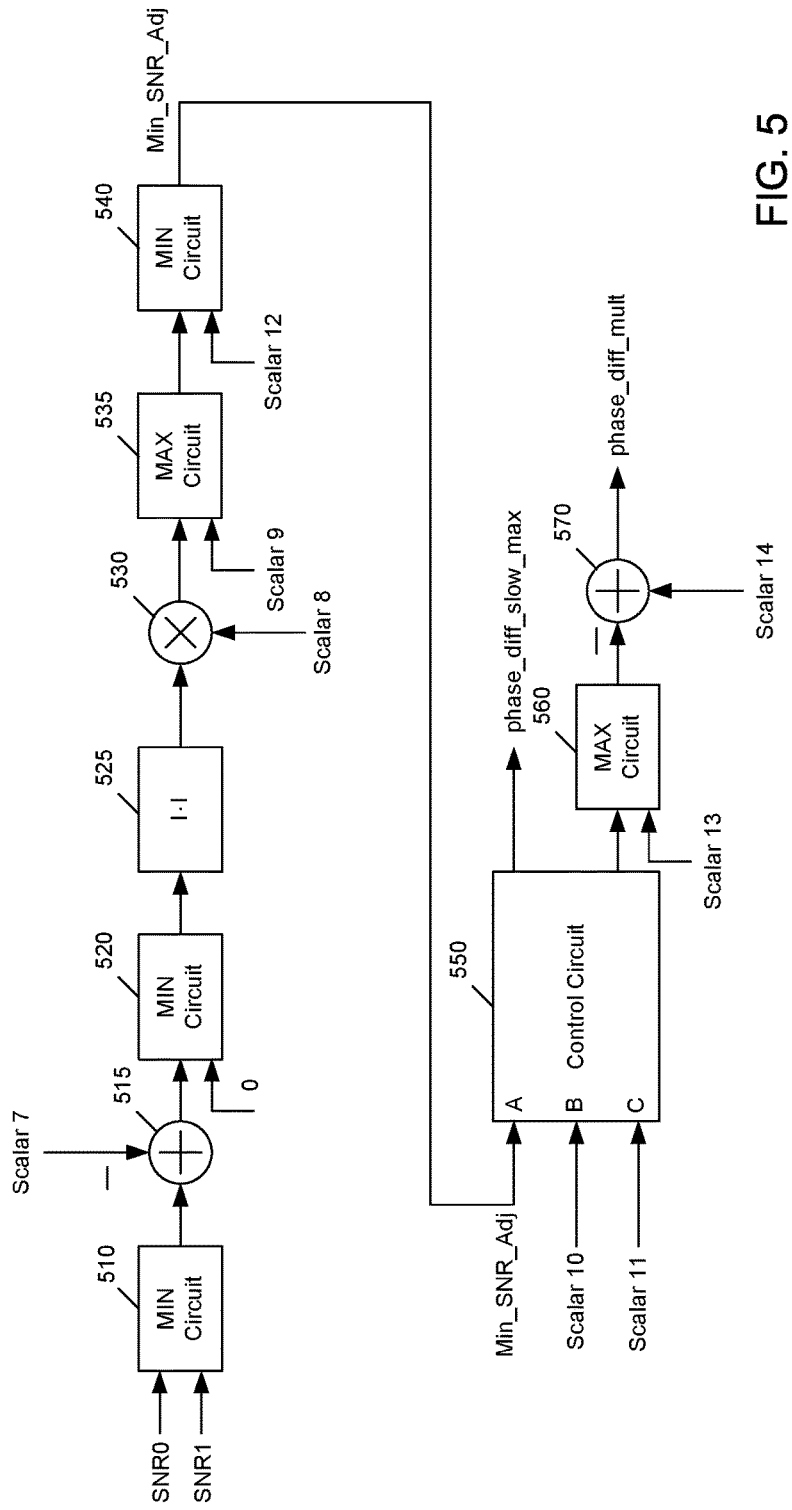
FIG. 5 is a block diagram of a mitigation determination circuit in accordance with an embodiment.

Referring now to FIG. 5, shown is a block diagram of a mitigation determination circuit in accordance with an embodiment. More specifically, circuit 500 shown in FIG. 5 may be used to perform intermediate calculations to determine when to use mitigations, namely a mitigation of a normal combining ratio when a minimum signal metric (namely a SNR metric) of the two signal paths is below a given level. As illustrated, circuit 500 is coupled to receive signal metrics, namely SNR levels regarding the two signal paths, which are received in a first minimum circuit 510. The resulting minimum value of these two SNR values is provided to a summer 515 where it is combined with a predetermined value (Scalar 7). The resulting sum is provided to another minimum circuit 520, which outputs the minimum value between this sum and a predetermined value (e.g., 0). The resulting minimum value is provided to an absolute value generator 525, and the resulting value is provided to a multiplier 530, where it is multiplied with a predetermined value (Scalar 8). The resulting product is provided to a maximum circuit 535, which outputs the maximum between this product and another predetermined value (Scalar 9). The resulting maximum value is then compared to another predetermined value (Scalar 12) in a minimum circuit 540, with the resulting minimum value corresponding to a minimum adjusted SNR value (min_SNR_adj).

As illustrated, this value is provided as a first input (input A) to a control circuit 550. Control circuit 550 further receives as input several predetermined values (Scalar 10 and Scalar 11, at inputs B and C). In an embodiment, control circuit 550 is configured to perform calculations based on these inputs to output a first phase difference value (phase_diff_slow_max) and a second value. In an embodiment, control circuit 550 may generate the first phase difference value according to: $B*2^4$. In turn, control circuit 550 may be configured to generate the second value according to: $C*(2^4-1)$. As seen, this second output from control circuit 550 is provided to a maximum circuit 560, which compares this value to another predetermined value (Scalar 13). The resulting maximum value is then provided to a summer 570 where it is summed with another predetermined value (Scalar 14), to generate a difference corresponding to a second phase difference value, phase_diff_mult. In an embodiment, this first phase difference value may move larger as the SNR level of at least one of the signal paths goes lower. In turn, the second phase difference value may have a level that proceeds linearly with SNR levels. That is, as SNR decreases, this phase difference value decreases also.

Figure 6:
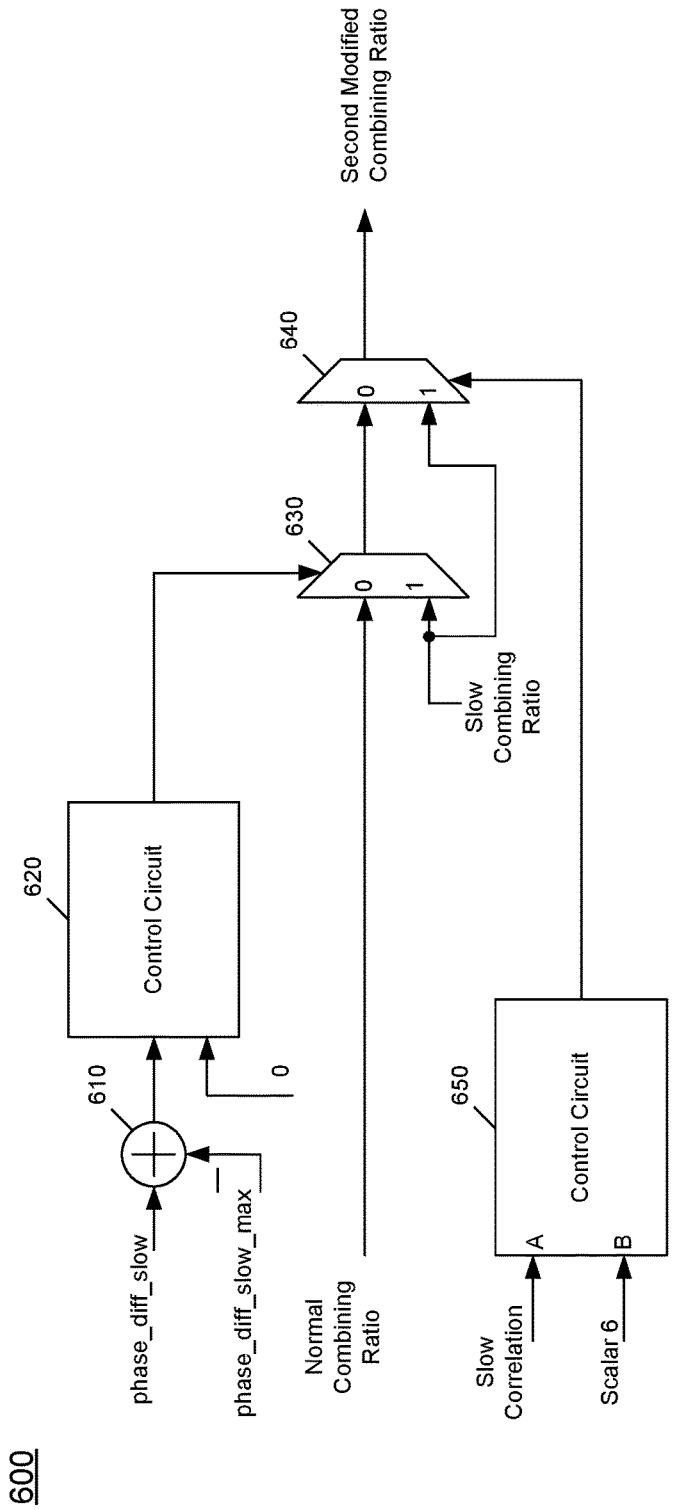
FIG. 6 is a block diagram of a selection circuit in accordance with an embodiment.

Referring now to FIG. 6, shown is a block diagram of a selection circuit in accordance with an embodiment. More specifically, selection circuit 600 may be configured to receive multiple combiner ratios, namely a baseline combiner ratio (Normal Combining Ratio) and a modified combining ratio (Slow Combining Ratio) and select one of these values to be used for weighting of the signals of the different signal paths as described herein. As illustrated, a first selection circuit 630 may be implemented as a first multiplexer and a second selection circuit 640 may be implemented as another multiplexer.

First selection circuit 630 is controlled by a control circuit 620. As illustrated, control circuit 620 is configured to receive a first input (input A) corresponding to a difference generated in a summer 610 between phase difference values (phase_diff_slow (generated as described below) and phase_diff_slow_max). Control circuit 620 is further configured to receive a second input (a predetermined value, e.g., 0). In an embodiment, control circuit 620 may control first selection circuit 630 to output the normal combiner ratio where the difference determined based on the phase difference values is less than a threshold value (e.g., 0). Otherwise, selection circuit 630 outputs the slow combining ratio. In turn, selection circuit 640 is controlled by another control circuit 650. As seen, control circuit 650 is configured to receive the slow correlation value at a first input (input A) and a predetermined value (Scalar 6) at a second input (input B). In an embodiment, control circuit 650 is configured to cause selection circuit 640 to output the slow combining ratio value if the slow correlation is greater than the predetermined value. As seen, second selection circuit 640 thus outputs a second modified combining ratio, which as described further below is used to generate weight values for weighting the two signal paths.

Figure 7:
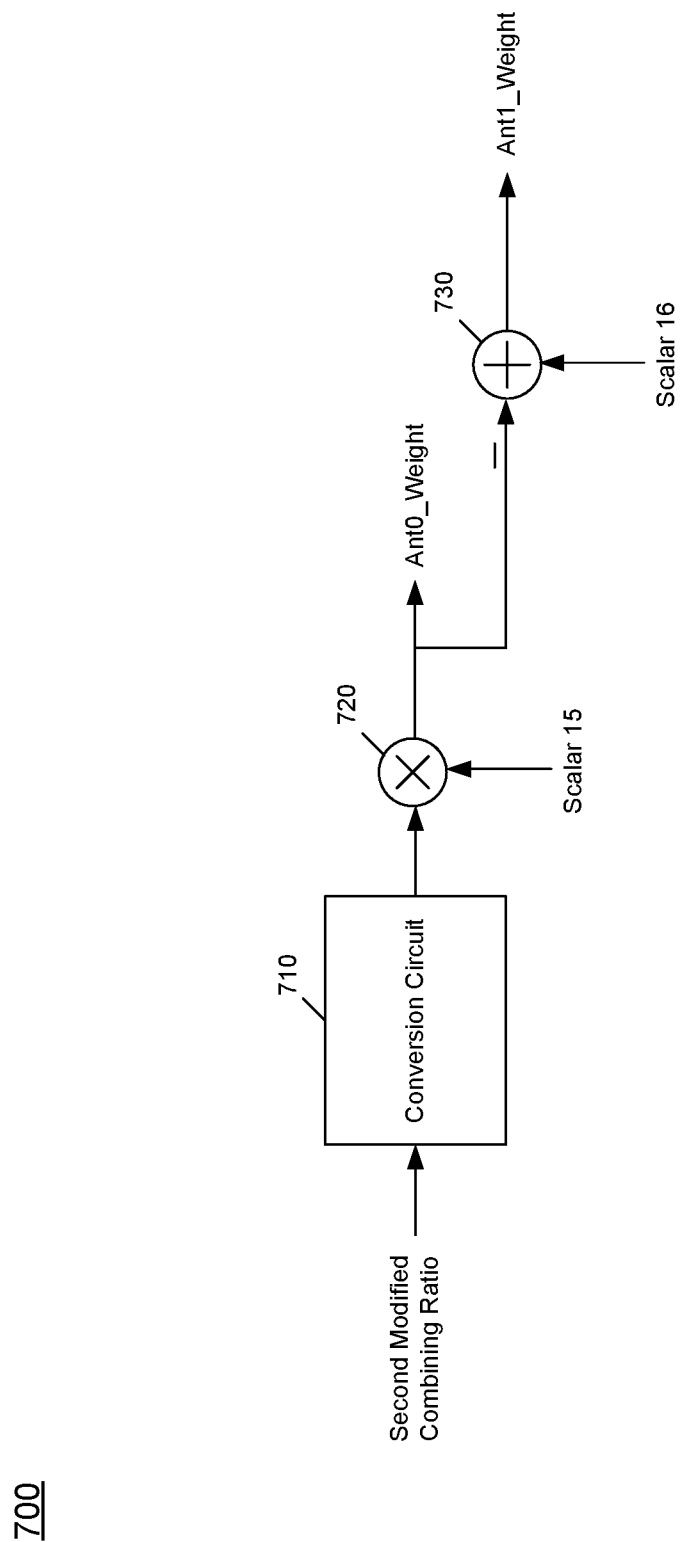
FIG. 7 is a block diagram of a first weight generation circuit in accordance with an embodiment.

Referring now to FIG. 7, shown is a block diagram of a first weight generation circuit in accordance with an embodiment. As illustrated in FIG. 7, circuit 700 may be used to generate a slowly computed combiner weight. As seen, circuit 700 includes a conversion circuit 710 configured to receive the second modified combining ratio. In an embodiment, conversion circuit 710 may convert this ratio from a log value to a linear value. The resulting linear value is provided to a multiplier 720 where it is multiplied by a predetermined value (Scalar 15). The resulting product is an initial weight value for the first signal path (Ant0_weight). In turn, an initial weight value for the second signal path (Ant1_weight) may be generated as a difference between another predetermined value (Scalar 16) and the first initial weight value. Note that these initial weight values are slowly computed weights, namely these weight values are computed for a group of samples. Although embodiments are not limited, as one example these weight values may be calculated for a group of 16 samples.

Figure 8:
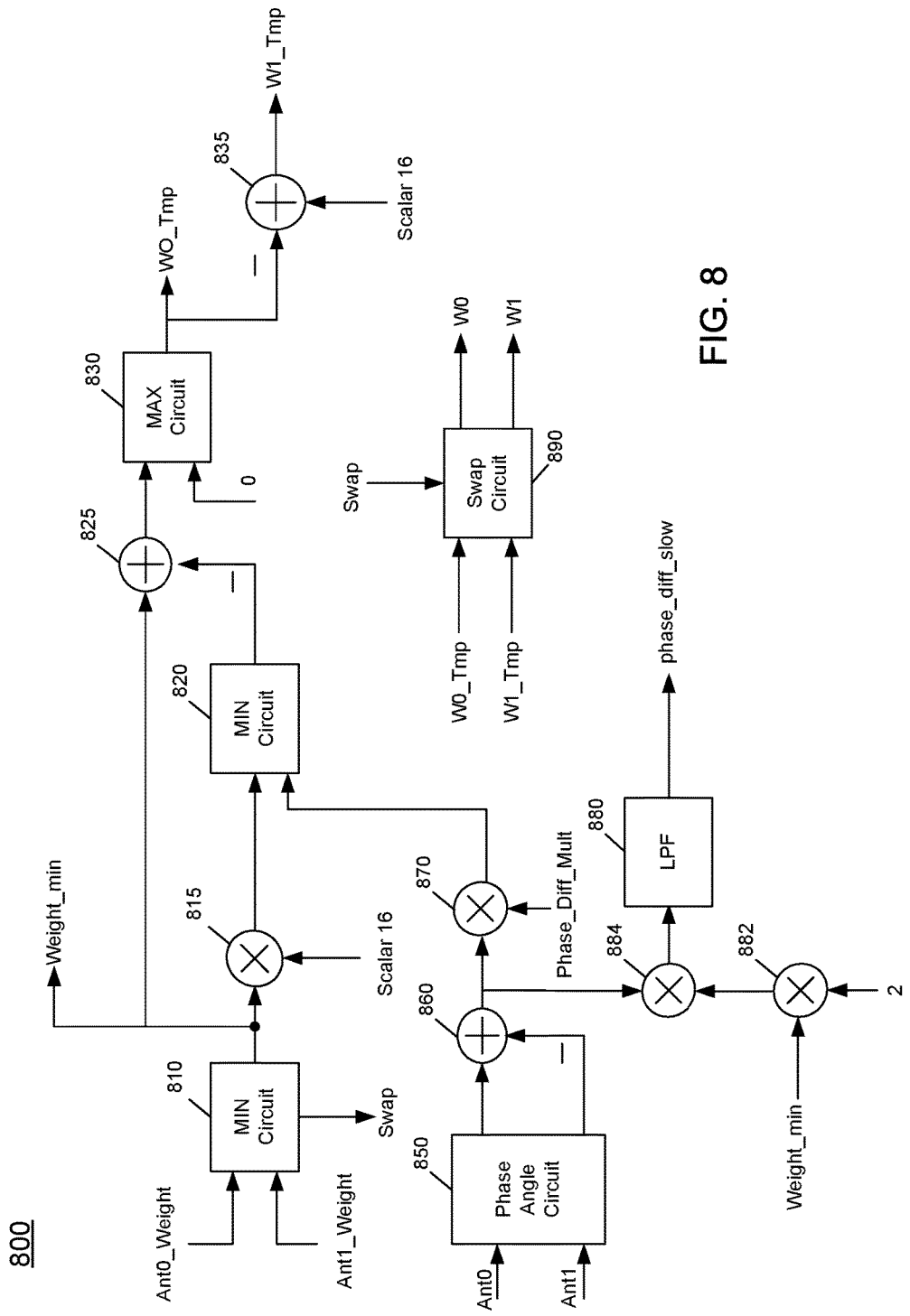
FIG. 8 is a block diagram of a second weight combining circuit in accordance with an embodiment.

Referring now to FIG. 8, shown is a block diagram of a second weight combining circuit in accordance with an embodiment. More specifically, weight combining circuit 800 is implemented as a sample-by-sample weight combiner, such that the weight value to be applied to each of the signal paths may be dynamically controlled on a sampleby-sample basis based on a phase error between the two signal paths. In an embodiment, more specifically this phase error may be a simple phase difference that is determined based on the digitized signals themselves after Phase alignment (namely channelized digitized signals). As seen, the initial weight values generated in first weight generation circuit 700 are provided to a minimum circuit 810, where the minimum value is output to a multiplier 815 and a combiner 825.

Second weight combiner circuit 800 further includes a phase angle circuit 850 to determine a phase angle for the individual samples of the two signal paths. As seen, phase angle circuit 850 receives incoming samples and determines a phase angle. In an embodiment, phase angle circuit 850 may perform a coordinate rotation digital computer (CORDIC) function on these values and provide the resulting values to summer 860, which determines a phase difference between the two samples. This resulting phase difference is provided to a multiplier 870 where it is multiplied by the second phase difference value (phase_diff_mult, from FIG. 5).

As further illustrated in FIG. 8, the phase difference determined at summer 860 is provided to a multiplier 884, where it is multiplied with a product of another multiplier 882, which is configured to multiply a predetermined value (e.g., 2) with a minimum weight value (weight_min). Note that the product output by multiplier 884 is provided to a low pass filter 880 that generates a filtered phase difference value (phase_diff_slow). As described above, this phase difference value may be compared to another phase difference value at summer 610 of FIG. 6.

In response to the product output by multiplier 882 (weight_min*2), filter 880 may operate normally when the combiner circuit is combining equally. Also the output of filter 880 may be automatically reduced when the combiner circuit starts to weight towards either antenna. This is desired because when the combiner is mainly weighted towards one antenna, there is not as much need for the filtered phase difference value (phase_diff_slow) to show that the phases are not aligned, since this is expected.

Still with reference to FIG. 8, the resulting product output by multiplier 870 is provided to a minimum circuit 820, along with the product of multiplier 815. As such this value based on the sample-based phase difference between the different signal paths may be used to modify the weighting determined by the second modified combining ratio (itself based on a slow path determination). Stated another way, this product output by multiplier 870, based on sample-by-sample phase differences, can be used to modify a combining ratio determined based on groups of blocks of samples, for each sample of the groups of blocks.

As shown in FIG. 8, minimum circuit 820 provides a minimum of the product from multiplier 870 and the (scaled) weighting value output from minimum circuit 810 to summer 825. The sum output by summer 825 is provided to a maximum circuit 830, which outputs a maximum value as a first temporary weight value for the first signal path (W0_tmp). Via a summer 835, which determines a difference between this weight value and a predetermined value (Scalar 16), a temporary weight value for the second signal path is also determined (W1_tmp).

Note that since it is possible for these weight values to be related to opposite signal paths, these resulting values are provided to a swap circuit 890, which in an embodiment may include logic circuitry and/or multiplexers or so forth. Based upon a swap signal (generated by minimum circuit 810), resulting final weight values W0 and W1 are determined. Note that this swap signal is inactive if minimum circuit 810 identifies the first signal path as being the minimum value (namely ANT0_weight), no swap occurs. Instead if minimum circuit 810 identifies the second signal path (ANT1_weight) as the minimum value, the swap signal is activated. As such, the temporary weight values are finalized (or swapped prior to finalization in swap circuit 890).

The resulting final weight signals (W0 and W1) are provided as coefficients to combining circuitry of the main signal processing path to weight the signals of the two signal paths. For example, with reference back to FIG. 1, these weight values are provided to multipliers $140_0$, $140_1$ to act as coefficients to weight the resulting outputs of phase aligner circuit 135. The products of these two multipliers are provided to a summer 145 to combine the two signal paths into a resulting digitized signal that is then provided, e.g., to a demodulator to demodulate the resulting signal.

Figure 9:
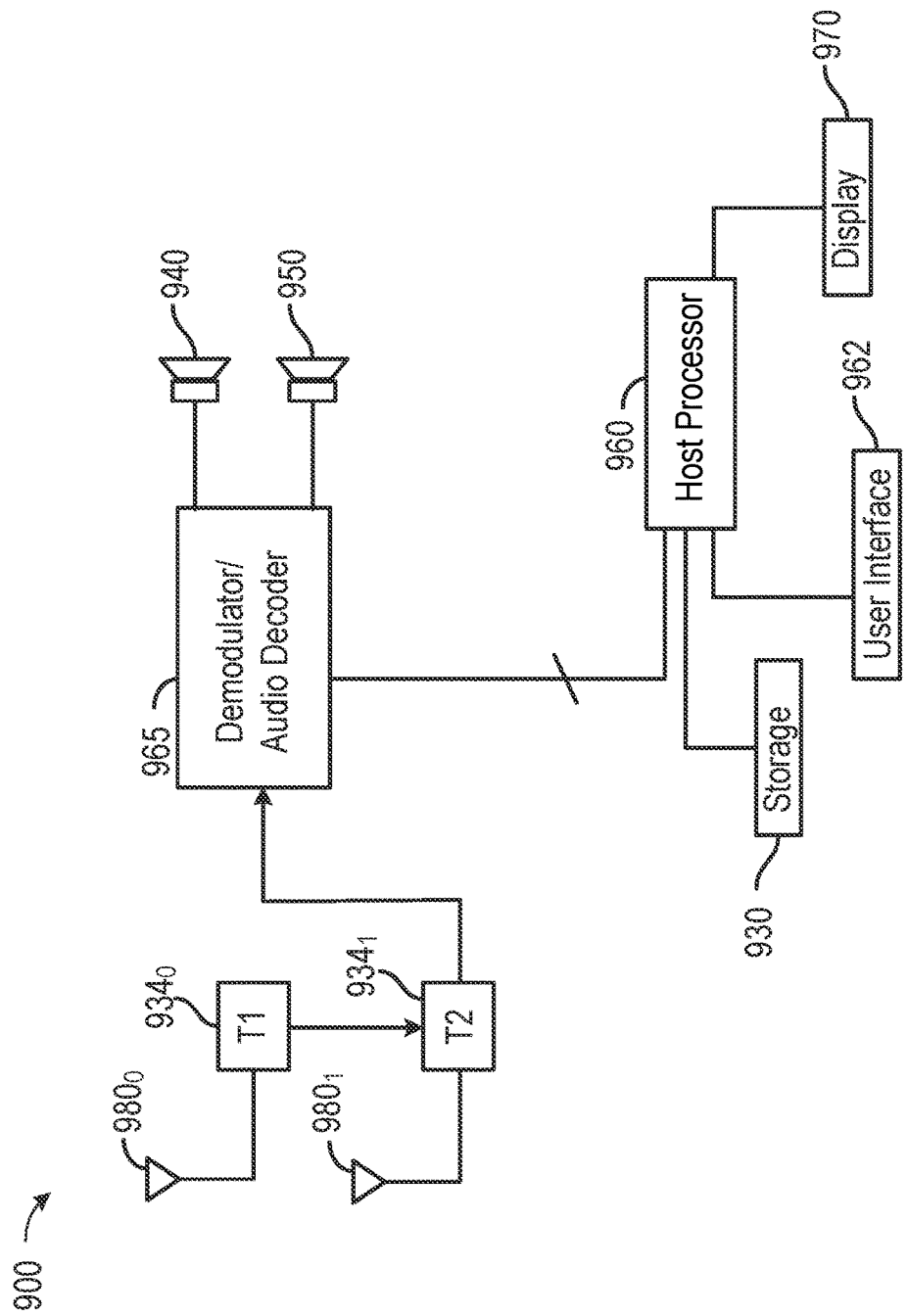
FIG. 9 is a block diagram of a system in accordance with an embodiment.

Referring to FIG. 9, a phase diversity combining technique can be part of a vehicle infotainment system 900. In other cases, system 900 may be a multi-function, multi-band radio, cellular telephone, smartphone, PDA, tablet computer, mobile game device, or so forth and may play music or book downloads, and may be part of a wireless link between a multiple antennas and a radio receiver. In one of the embodiments, the wireless device may be a mobile radio receiver such as of a car stereo.

Among its other various functions, system 900 may store digital content on a storage 930, which may be a flash memory or hard disk drive, as a few examples. System 900 generally includes an application subsystem 960 (referred to as a host processor) that may, for example, receive input from a user interface 962 of the wireless device 910 (which may be a touchpad, e.g., of a display 970) and display information on display 970. Furthermore, application subsystem 960 may generally control the retrieval and storage of content from storage 930. As further seen in FIG. 9, multiple antennas $980_0$-$980_1$ each may be coupled to a corresponding tuner $934_0$-$934_1$, which can be coupled together such that the tuner $934_1$ performs the phase diversity combining described herein, based at least in part on correlation information of the signals of tuners $934_{1,\,2}$. In turn, tuner $934_1$ outputs a combined signal to a demodulator/audio decoder 965, which may be directly connected to speakers 940 and 950 for output of audio data (understand that in some embodiments a separate audio processor may be integrated between the receiver and speakers). Note that storage 930 or another non-transitory storage medium (such as present within tuners 934 themselves) may further store instructions to perform the phase diversity combining described herein. Of course, embodiments may be implemented in many other types of systems.

Figure 10:
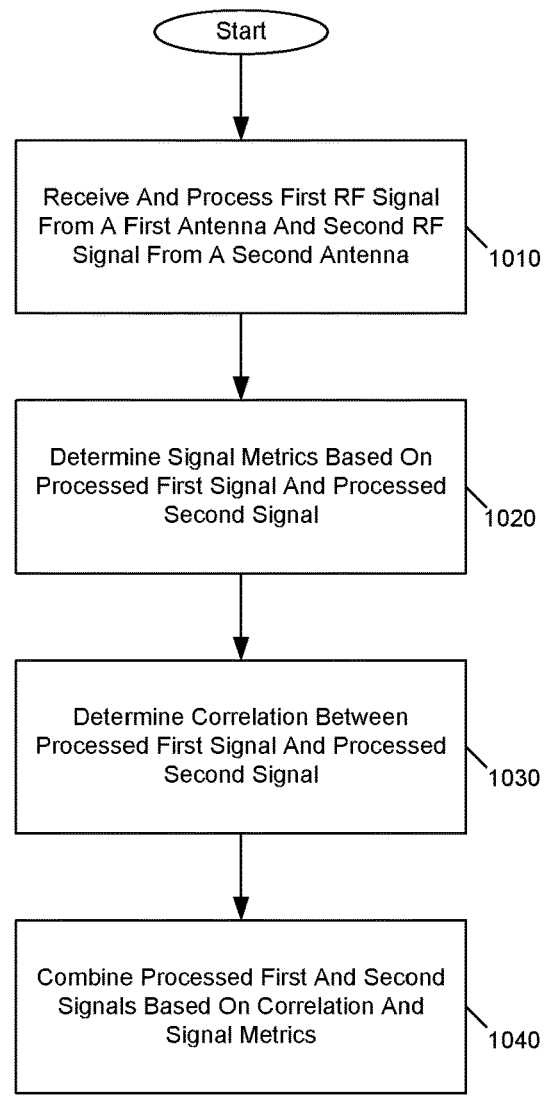
FIG. 10 is a flow diagram of a method in accordance with an embodiment.

Referring now to FIG. 10, shown is a flow diagram of a method in accordance with an embodiment. More specifically, method 1000 of FIG. 10 is a high level view of the diversity combining operation described herein. In embodiments, method 1000 may be performed by hardware circuitry of a receiver, potentially in combination with firmware and/or software. In some cases, method 1000 may be performed within circuitry as shown in FIG. 1, e.g., under control of a microcontroller or other control circuit of a given entertainment system.

As illustrated, method 1000 begins by receiving and processing first and second RF signals from first and second antennas (block 1010). As discussed above, at least these two RF signals may be received from at least two spatially separated antennas to enable diversity combining to be performed. This processing includes various analog front end processing, down conversion, digital conversion and additional signal processing. Next at block 1020 signal metrics may be determined based on these processed first and second signals. As described herein, these signal metrics may include SNR and RSSI values for groups of samples of the two signals.

Still referring to FIG. 10, at block 1030 a correlation may be determined between the processed signals. In an embodiment, this correlation may be implemented as a cross-correlation that is similarly performed on samples of a block of samples by low pass filtering and computing over a relatively large number of samples. Finally, at block 1040 the processed first and second signals may be combined based on the correlation and the signal metrics. More specifically as described herein, the signals from these different signal paths may be combined according to a combining ratio determined based solely on the signal metric information when the signals are highly correlated. Instead, in the face of some amount of uncorrelation, a baseline combining ratio determined based on the signal metrics may be modified and further adjusted according to various calculations described herein, and determinations of phase differences between individual samples of the two signal paths. Understand while shown at this high level in the embodiment of FIG. 10, many variations and alternatives are possible.

Figure 11:
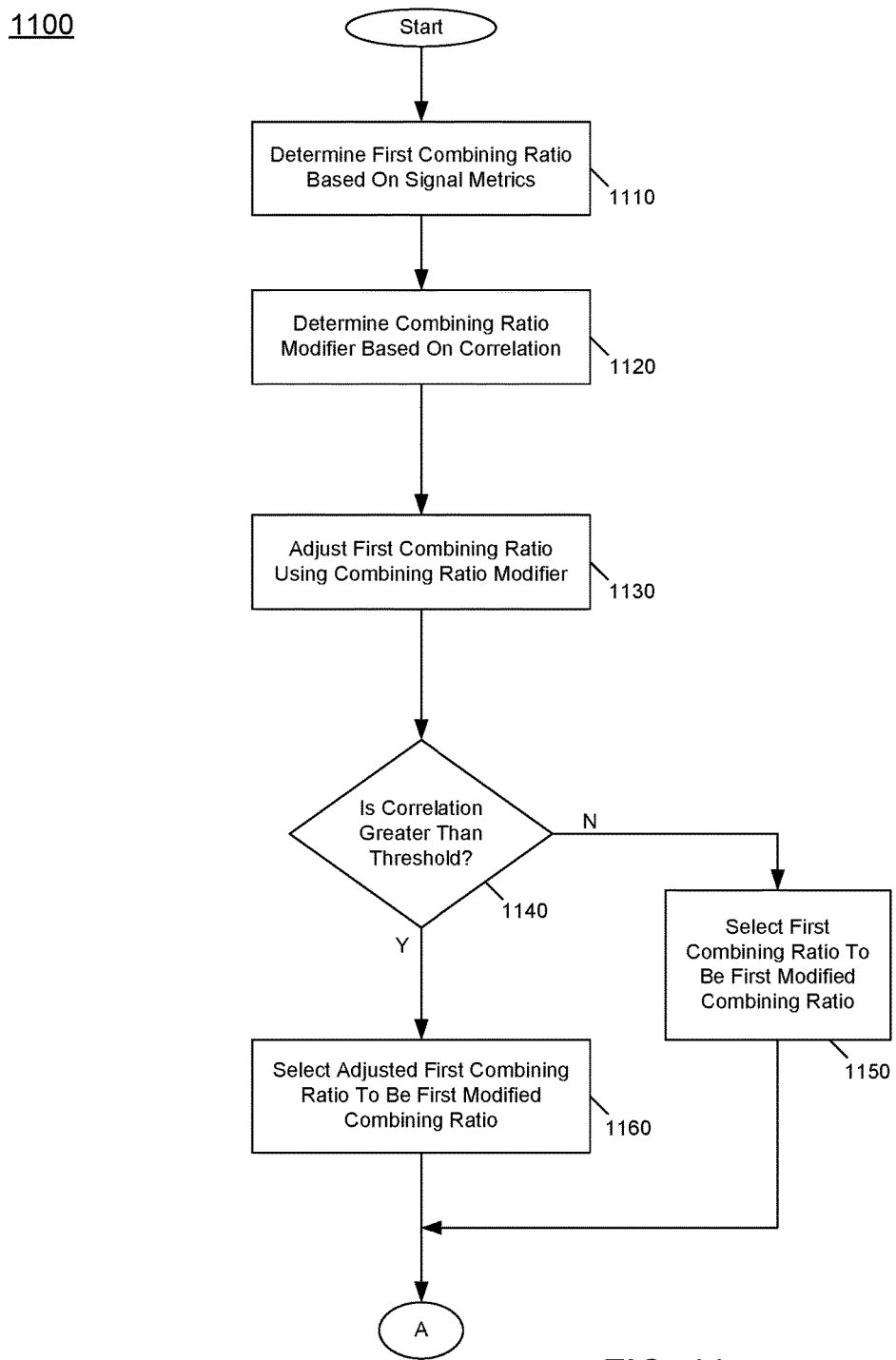
FIG. 11 is a flow diagram of a method in accordance with another embodiment.

Referring now to FIG. 11, shown is a flow diagram of a method in accordance with another embodiment. More specifically, method 1100 shown in FIG. 11 is a first part of an overall phase diversity combining operation. As illustrated, method 1100 begins by determining a first combining ratio based on signal metrics (block 1110). For example, for a given plurality of samples SNR and RSSI information may be leveraged to determine a first or baseline combining ratio, as described herein. Next at block 1120 a combining ratio modifier may be determined based at least in part on correlation information. That is, as described herein for cases in which signals are not well correlated, some modification to this first combining ratio may be warranted. Thereafter, the first combining ratio may be adjusted using this combining ratio modifier (block 1130). As an example, the combining ratio modifier may be used to generate an adjustment value that in turn is used to modify the first combining ratio into this adjusted first combining ratio.

Still with reference to FIG. 11, next it is determined whether the correlation is greater than a threshold level. That is, this determination at diamond 1140 is whether the signals are correlated to at least a threshold level. If not, control passes to block 1160 where the adjusted first combining ratio may be selected to be a first modified combining ratio. Instead, if the signals are well correlated (where in a particular embodiment a determined correlation value may be less than a given threshold), control passes to block 1150 where the first combining ratio may be selected to be the first modified combining ratio.

Figure 12:
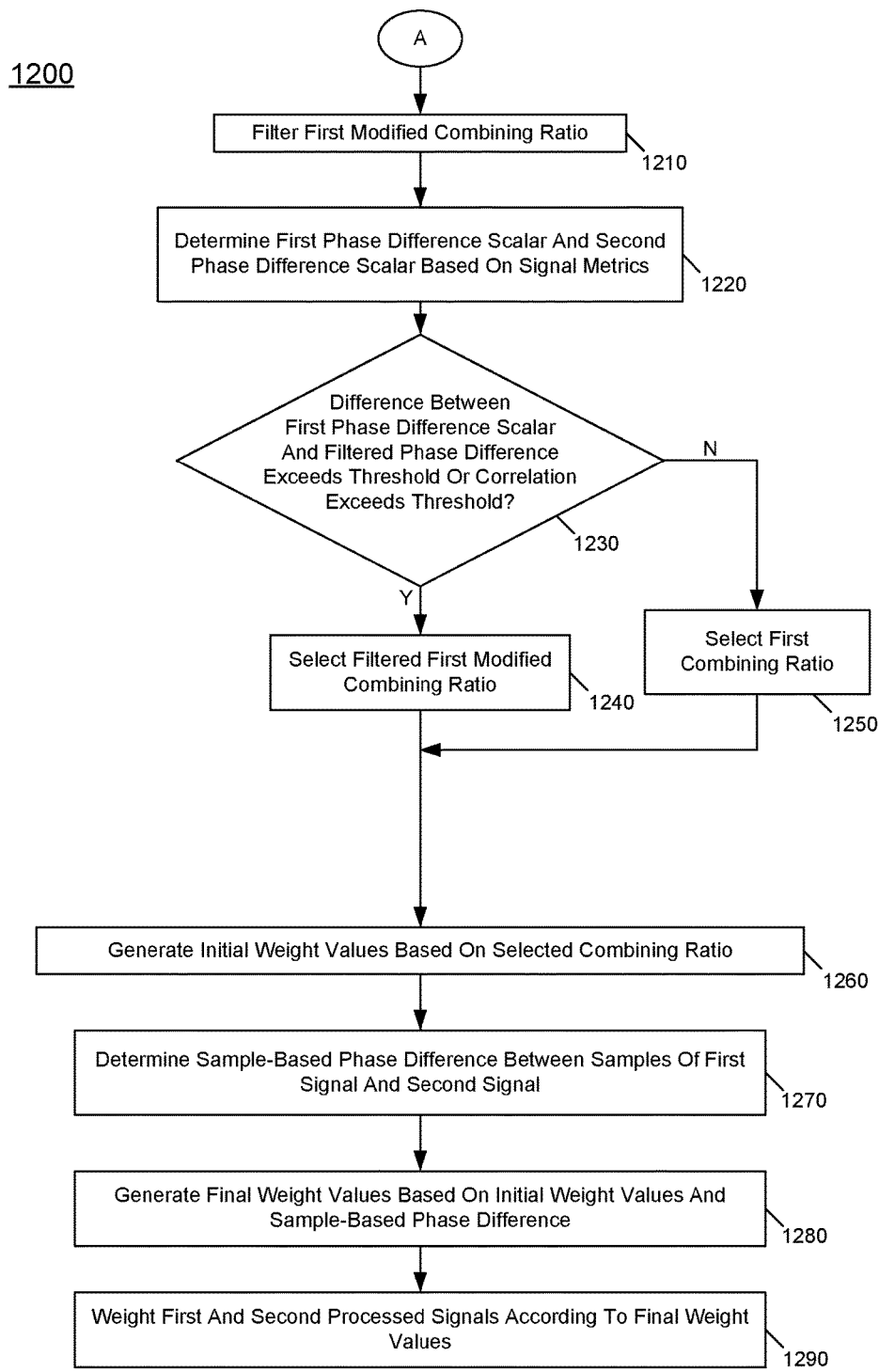
FIG. 12 is a flow diagram of a method in accordance with another embodiment.

Referring now to FIG. 12, shown is a flow diagram of a method in accordance with another embodiment. More specifically, FIG. 12 shows a further portion of a phase diversity combining operation in accordance with an embodiment. As illustrated in FIG. 12, method 1200 proceeds after selection of the appropriate source for the first modified combining ratio (in FIG. 11). More specifically at block 1210, this first modified combining ratio is filtered. Note that this filtering operation may be a relatively long term operation to take into account a large number of groups of samples (e.g., on the order of hundreds, at least). Next, at block 1220 first and second phase difference scalars may be determined based on signal metrics. Next at diamond 1230 a difference between a first phase difference scalar and a filtered second phase difference may be determined. Further it is determined whether this phase difference exceeds a threshold. If this is so, there is an undesired phase difference between the signals of the two paths. It is further determined here whether the correlation exceeds a threshold (meaning that the signals are at least somewhat uncorrelated). If either of these determinations is made, control passes to block 1240 where the filtered first modified combining ratio may be selected. Otherwise, control passes to block 1250 where the first combining ratio may be selected.

Still with reference to FIG. 12 in any event, control next passes to block 1260 where initial weight values may be determined based on the selected combining ratio. Thereafter at block 1270 a sample-based phase difference may be determined between samples of the two signals. At block 1280, final weight values may be generated based on the initial weight values and this sample-based phase difference. Thereafter at block 1290, the first and second processed signals may be weighted according to the final weight values to result in a combined signal, which may then be provided for further processing (such as demodulation and/or decoding and output). Thus by using an embodiment, an initial weight value may be determined for a set of samples, and then sample-by-sample adjustment may occur based on identification of instantaneous phase difference between given samples of the first and second signals. In this way, embodiments provide improved maximal ratio combining in a phase diversity system.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a first radio receiver to receive and downconvert a first radio frequency (RF) signal to a first digital signal;
    a second radio receiver to receive and downconvert a second RF signal to a second digital signal;
    a correlation circuit to receive the first digital signal and the second digital signal and determine a correlation between the first digital signal and the second digital signal;
    a weight calculation circuit to determine a first weight value and a second weight value based at least in part on the correlation; and
    a combiner circuit to combine the first digital signal and the second digital signal according to the first weight value and the second weight value.

2. The apparatus of claim 1, wherein the weight calculation circuit is to determine the first weight value and the second weight value further based on at least one signal metric associated with the first digital signal and at least one signal metric associated with the second digital signal.

3. The apparatus of claim 2, wherein the weight calculation circuit is to adjust the first weight value and the second weight value determined further based on the at least one signal metric associated with the first digital signal and the at least one signal metric associated with the second digital signal when the correlation indicates the first digital signal is uncorrelated with the second digital signal.

4. The apparatus of claim 1, wherein the weight calculation circuit is to determine the first weight value and the second weight value for a plurality of samples of the first digital signal and the second digital signal.

5. The apparatus of claim 4, wherein the weight calculation circuit is to adjust the first weight value and the second weight value for a first sample of the plurality of samples of the first digital signal and a first sample of the plurality of samples of the second digital signal based at least in part on a phase difference between the first digital signal and the second digital signal.

6. The apparatus of claim 1, wherein the correlation circuit is to determine the correlation comprising a cross-correlation between the first digital signal and the second digital signal.

7. The apparatus of claim 1, wherein, in response to the correlation indicating that the second digital signal is uncorrelated with the first digital signal, the weight calculation circuit is to adjust the first weight value to be substantially greater than the second weight value, wherein the correlation results from receipt of first content in the first RF signal and receipt of second content in the second RF signal, the first content different than the second content.

8. The apparatus of claim 1, wherein the apparatus comprises a phase diversity receiver comprising:
a first semiconductor die including the first radio receiver to receive the first RF signal from a first antenna; and
a second semiconductor die including the second radio receiver to receive the second RF signal from a second antenna, the second antenna spatially separated from the first antenna.

9. The apparatus of claim 1, wherein the apparatus comprises a digital signal processor comprising the correlation circuit and the weight calculation circuit.

10. At least one non-transitory computer readable medium including instructions that when executed enable a system to perform a method comprising:
receiving and processing a first radio frequency (RF) signal from a first antenna into a processed first signal;
receiving and processing a second RF signal from a second antenna into a processed second signal;
determining first signal metric information based on the processed first signal and determining second signal metric information based on the processed second signal;
determining a correlation between the processed first signal and the processed second signal; and
combining the processed first signal and the processed second signal based on the first signal metric information and the second signal metric information, and adjusting the combining based on the correlation.

11. The at least one non-transitory computer readable medium of claim 10, wherein the method further comprises:
determining a first combining ratio based on the first signal metric information and the second signal metric information;
determining a combining ratio modifier based on the correlation;
establishing the first combining ratio to be a first modified combining ratio in response to the correlation indicating that the processed first signal is correlated to the processed second signal to at least a threshold level; and
establishing an adjusted combining ratio to be the first modified combining ratio in response to the correlation indicating that the processed first signal is correlated to the second process signal to less than the threshold level.

12. The at least one non-transitory computer readable medium of claim 11, wherein the method further comprises:
adjusting the first combining ratio using the combining ratio modifier, the combining ratio modifier based on a filtered correlation value determined over a plurality of groups of samples of the processed first signal and the processed second signal, each of the plurality of groups including a plurality of samples of the processed first signal and a plurality of samples of the processed second signal.

13. The at least one non-transitory computer readable medium of claim 12, wherein the method further comprises determining a first phase difference value and a second phase difference value based on at least one of the first signal metric information and the second signal metric information.

14. The at least one non-transitory computer readable medium of claim 13, wherein the method further comprises:
establishing the first combining ratio to be an initial combining ratio in response to a difference between the first phase difference value and the second phase difference value being less than a first threshold and the correlation indicating that the processed first signal is correlated to the processed second signal to at least a second threshold level; and
otherwise, establishing the first modified combining ratio to be the initial combining ratio.

15. The at least one non-transitory computer readable medium of claim 14, wherein the method further comprises:
generating a first weight value and a second weight value according to the initial combining ratio;
weighting the processed first signal according to the first weight value;
weighting the processed second signal according to the second weight value;
combining the weighted processed first signal and the weighted processed second signal; and
outputting the combined signal to a demodulator.

16. The at least one non-transitory computer readable medium of claim 15, wherein the method further comprises:
determining a phase difference between a first sample of the processed first signal and a first sample of the processed second signal; and
adjusting the first weight value and the second weight value based on the phase difference.

17. The at least one non-transitory computer readable medium of claim 16, wherein the method further comprises combining the processed first signal and the processed second signal according to the adjusted first weight value and the adjusted second weight value.

18. An apparatus comprising:
a first radio receiver to receive and downconvert a first radio frequency (RF) signal from a first antenna to a first digital signal;
a second radio receiver to receive and downconvert a second RF signal from a second antenna to a second digital signal;
a phase aligner circuit to phase align the first digital signal and the second digital signal;
a correlation circuit to receive the first digital signal and the second digital signal and determine a correlation between the first digital signal and the second digital signal;
a weight calculation circuit to determine a first weight value and a second weight value based at least in part on the correlation; and a combiner circuit to use the first weight value and the second weight value to combine the first phase aligned digital signal and the second phase aligned digital signal into a combined signal.

19. The apparatus of claim 18, wherein the weight calculation circuit is to determine a phase difference between a first sample of the first digital signal and a first sample of the second digital signal and adjust at least one of the first weight value and the second weight value based on the phase difference.

20. The apparatus of claim 19, wherein the weight calculation circuit is to adjust the first weight value and the second weight value based on at least one signal metric associated with the first digital signal and at least one signal metric associated with the second digital signal when the correlation exceeds a threshold.

\* \* \* \* \*